United States Patent
Lee et al.

(10) Patent No.: US 11,880,768 B2
(45) Date of Patent: *Jan. 23, 2024

(54) METHOD AND APPARATUS WITH BIT-SERIAL DATA PROCESSING OF A NEURAL NETWORK

(71) Applicants: SAMSUNG ELECTRONICS CO., LTD., Suwon-si (KR); Seoul National University R&DB Foundation, Seoul (KR)

(72) Inventors: Seungwon Lee, Hwaseong-si (KR); Dongwoo Lee, Seoul (KR); Kiyoung Choi, Seoul (KR); Sungbum Kang, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,978

(22) Filed: Mar. 1, 2023

(65) Prior Publication Data

US 2023/0214652 A1 Jul. 6, 2023

Related U.S. Application Data

(63) Continuation of application No. 16/255,311, filed on Jan. 23, 2019, now Pat. No. 11,630,997.
(Continued)

(30) Foreign Application Priority Data

Apr. 6, 2018 (KR) .................. 10-2018-0040601

(51) Int. Cl.
*G06N 3/08* (2023.01)
*G06N 3/04* (2023.01)
(Continued)

(52) U.S. Cl.
CPC .............. *G06N 3/08* (2013.01); *G06F 5/01* (2013.01); *G06F 7/49942* (2013.01);
(Continued)

(58) Field of Classification Search
CPC ....................................... G06N 3/08
See application file for complete search history.

(56) References Cited

U.S. PATENT DOCUMENTS 5,630,024 A 5/1997 Aihara et al.
2017/0102921 A1* 4/2017 Henry ............... G06F 7/57
(Continued)

FOREIGN PATENT DOCUMENTS

| JP | 11-15641 A | 1/1999 |
| JP | 3292073 B2 | 6/2002 |
| KR | 0168975 B1 | 1/1999 |

OTHER PUBLICATIONS

Earl E. Swartzlander, Jr., "The Negative Two's Complement Number System," *Journal of VLSI Signal Processing*, vol. 49, Jan. 2007, pp. 177-183 (7 pages, in English).
(Continued)

*Primary Examiner* — Michael J Metzger
(74) *Attorney, Agent, or Firm* — NSIP Law

(57) ABSTRACT

A processor-implemented data processing method includes encoding a plurality of weights of a filter of a neural network using an inverted two's complement fixed-point format; generating weight data based on values of the encoded weights corresponding to same filter positions of a plurality of filters; and performing an operation on the weight data and input activation data using a bit-serial scheme to control when to perform an activation function with respect to the weight data and input activation data.

20 Claims, 16 Drawing Sheets

Related U.S. Application Data

(60) Provisional application No. 62/620,740, filed on Jan. 23, 2018.

(51) Int. Cl.
  *G06F 5/01* (2006.01)
  *G06F 7/499* (2006.01)
  *G06F 7/544* (2006.01)

(52) U.S. Cl.
  CPC .............. *G06F 7/5443* (2013.01); *G06N 3/04* (2013.01); *G06F 2207/4824* (2013.01)

(56) References Cited

U.S. PATENT DOCUMENTS

2017/0357891 A1* 12/2017 Judd ..................... G06N 3/049
2018/0314941 A1* 11/2018 Lie .......................... G06N 3/04

OTHER PUBLICATIONS

Tianshi Chen, et al., "DianNao: A Small-Footprint High-Throughput Accelerator for Ubiquitous Machine-Learning," *Proceedings of the 19th International Conference on Architectural Support for Programming Languages and Operating Systems*, Salt Lake City, Utah, USA, Mar. 2014, pp. 269-283 (15 pages, in English).

Yunji Chen, et al., "DianNao Family: Energy-Efficient Hardware Accelerators for Machine Learning," *Communications of the ACM*, vol. 59, No. 11, Nov. 2016, pp. 105-112 (8 pages, in English).

Patrick Judd, et al., "Stripes: Bit-Serial Deep Neural Network Computing," *Proceedings of the 49th Annual IEEE/ACM International Symposium on Microarchitecture (MICRO)*, Taipei, Taiwan, Oct. 2016 (12 pages, in English).

Jorge Albericia, et al., "Bit-Pragmatic Deep Neural Network Computing," *Proceedings of the 50th Annual IEEE/ACM International Symposium on Microarchitecture*, Cambridge, Massachusetts, USA, Oct. 2017, pp. 382-394 (13 pages, in English).

* cited by examiner

Sliding window

Sliding window

METHOD AND APPARATUS WITH BIT-SERIAL DATA PROCESSING OF A NEURAL NETWORK

CROSS-REFERENCE TO RELATED APPLICATION

This application is a continuation of U.S. patent application Ser. No. 16/255,311 filed on Jan. 23, 2019 which claims the benefit of U.S. Provisional Application No. 62/620,740, filed on Jan. 23, 2018 in the U.S. Patent Trademark and Office, and Korean Patent Application No. 10-2018-0040601, filed on Apr. 6, 2018 in the Korean Intellectual Property Office, the entire disclosures of which are incorporated herein by reference for all purposes.

BACKGROUND

1. Field

The disclosure relates to methods and apparatuses with data processing, and more particularly, to a neural network-based method and an apparatus including performing a sum of products operation in neural network processing.

2. Description of Related Art

Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement. Also, such neural network implementations typically require large computational amounts with respect to complex input data.

Also, in some neural network approaches, a rectified linear unit (ReLU) activation function may be used as the activation function of one or more nodes of one or more neural network layers, for example. The ReLU activation function outputs 0 when an input value to the activation function is a negative number and outputs the input value when the input value is a positive number. If it can be quickly determined whether the input value is a negative number, a computational amount with respect to a particular activation may be effectively reduced, e.g., compared to performing the activation processing of the negative value to merely obtain in the 0 value.

Typical approaches may including determining whether the input of a ReLU activation function is a negative number only after a sum-of-products operation, e.g., for the relevant weighted connections to a particular node, has been performed, and techniques of reducing computational amounts may be applied at the expense of sacrificing accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented data processing method including: encoding a plurality of weights of a filter of a neural network using an inverted two's complement fixed-point format; generating weight data based on values of the encoded weights corresponding to same filter positions of a plurality of filters; and performing an operation on the weight data and input activation data using a bit-serial scheme to control when to perform an activation function with respect to the weight data and input activation data.

The filter may include a plurality of filter layers; and the generating of the weight data may include grouping weight values of the encoded weights of the filter layers corresponding to a same position.

The performing of the operation may be included in a convolutional operation.

The performing of the operation may include outputting 0 in response to an operation result being a negative number.

The performing of the operation may include determining to perform the activation function without performing another operation on one or more of the weight data and one or more of the input activation data in response to an operation result being a negative number.

The performing of the operation may include determining, in response to an operation result being a positive number, whether the weight data used in a subsequent operation included in the operation is generated by using values corresponding to a least significant bit (LSB) of any one of the plurality of filters.

The performing of the operation may include outputting the operation result in response to determining that the weight data used in the subsequent operation is generated using the values corresponding to the LSB of the any one of the plurality of filters.

The performing of the operation may include receiving weight data generated using values corresponding to a next position of any one of the plurality of filters in response to determining that the weight data used in the subsequent operation is not generated using the values corresponding to the LSB of the any one of the plurality of filters.

The performing of the operation may include: ending the operation in response to determining that the weight data used in the operation is generated based on weight values of the weight values of a last filter of the plurality of filters; and receiving, for a subsequent operation included in the operation, weight data generated using values corresponding to a most significant bit (MSB) of a next filter in response to determining that the weight data used in the operation is not generated based on weight values of the weight values of a last filter of the plurality of filters.

The performing of the operation may include ending the operation in response to determining that the weight data used in the operation is generated based on weight values of the weight values of a same last position of the plurality of filters, based on a sliding window technique.

The performing of the operation may include: performing a primary operation by receiving weight data of the weight data generated using values corresponding to an MSB of any one or any combination of any two or more of the plurality of filters; and performing an nth operation by receiving weight data of the weight data generated using values corresponding to positions shifted by n from the MSB of any one of the plurality of filters, wherein n is a natural number.

A non-transitory computer-readable recording medium may store instructions that, when executed by one or more processors, cause the one or more processors to perform the method.

In another general aspect, there is provided a neural network apparatus including: a memory configured to store weight data and input activation data; and one or more processors configured to perform an operation on the weight data and input activation data using a bit-serial scheme, wherein the weight data is generated based on values of encoded weights corresponding to same filter positions of a plurality of weights included in each of a plurality of filters, and wherein the encoded weights are generated by encoding a plurality of weights based on a two's complement fixed-point format in which the plurality of weights are inverted.

The one or more processors may be configured to output 0 in response to an operation result being a negative number.

The one or more processors may be configured to determine, in response to an operation result being a positive number, whether the weight data used in a subsequent operation is generated by using values corresponding to a least significant bit (LSB) of any one of the plurality of filters.

The one or more processors may be configured to output the operation result in response to determining that the weight data used in the subsequent operation is generated using the values corresponding to the LSB of any one of the plurality of filters.

The one or more processors may be configured to receive weight data generated using values corresponding to a next position of any one of the plurality of filters in response to determining that the weight data used in the subsequent operation is not generated using the values corresponding to the LSB of the any one of the plurality of filters.

The one or more processors may be configured to: end the operation in response to determining that the weight data used in the operation is generated based on weight values of the weight values of a last filter of the plurality of filters; and receive, for a subsequent operation included in the operation, weight data generated using values corresponding to a most significant bit (MSB) of a next filter in response to determining that the weight data used in the operation is not generated based on weight values of the weight values of a last filter of the plurality of filters.

The one or more processors may be configured to: perform a primary operation by receiving weight data of the weight data generated using values corresponding to an MSB of any one or any combination of any two or more of the plurality of filters; and perform an nth operation by receiving weight data of the weight data generated using values corresponding to positions shifted by n from the MSB of any one of the plurality of filters, wherein n is a natural number.

The one or more processors may be configured to receive weight data generated using values corresponding to positions shifted by n from the MSB of any one of the plurality of filters in response to performing the operation on the weight data and input activation data using the bit-serial scheme.

Each of pieces of processing equipment (PE) included in the one or more processors may be configured to perform the operation on the encoded weight data and input activation data, and the pieces of PE are connected to one another in a tree form.

The one or more processors may include a data network configured to match in a 1:1 correspondence weight buffers configured to store the weight data generated based on the values corresponding to the same position of the plurality of weights included in each of the plurality of filters and rows of a matrix in which pieces of processing equipment (PE) are arranged.

The pieces of PE may include output units located at an upper portion of a tree and input units located at a lower portion of the tree in a column unit connected to the output units.

The one or more processors may include a global controller configured to determine an intermediate resultant value of an operation and dynamically determine next weight data received by a piece of processing equipment (PE).

The global controller may include a plurality of determiners, wherein each of the plurality of determiners may include a pipe-line list and an entry board, wherein the pipeline list may include information about an ID of at least one filter corresponding to the weight data and digit positions corresponding to the weight data, and wherein the entry board may include information about the ID of at least one filter corresponding to the weight data, a maximum digit position of the at least one filter included in the pipe-line list, and an intermediate resultant value of the operation The one or more processors may include a plurality of processors, and the data processing apparatus may include a network on chip to which the plurality of processors are connected.

Provided are data processing methods and apparatuses.

Additional aspects will be set forth in part in the description which follows and, in part, will be apparent from the description, or may be learned by practice of the presented embodiments.

According to an aspect of an embodiment, a data processing method includes encoding a plurality of weights using an inverted two's complement fixed-point format; generating weight data using values corresponding to same positions of the encoded plurality of weights included in each of a plurality of filters; and performing an operation on the weight data and input activation data using a bit-serial scheme.

According to an aspect of another embodiment, a data processing apparatus includes a memory storing weight data and input activation data; and at least one processor configured to perform an operation on the weight data and input activation data using a bit-serial scheme, wherein the weight data is generated based on values corresponding to same positions of a plurality of weights included in each of a plurality of filters, and wherein the plurality of weights are encoded based on a two's complement fixed-point format in which the plurality of weights are inverted.

According to an aspect of another embodiment, a non-transitory computer-readable recording medium includes a recording medium having recorded thereon one or more programs including instructions for executing the method described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
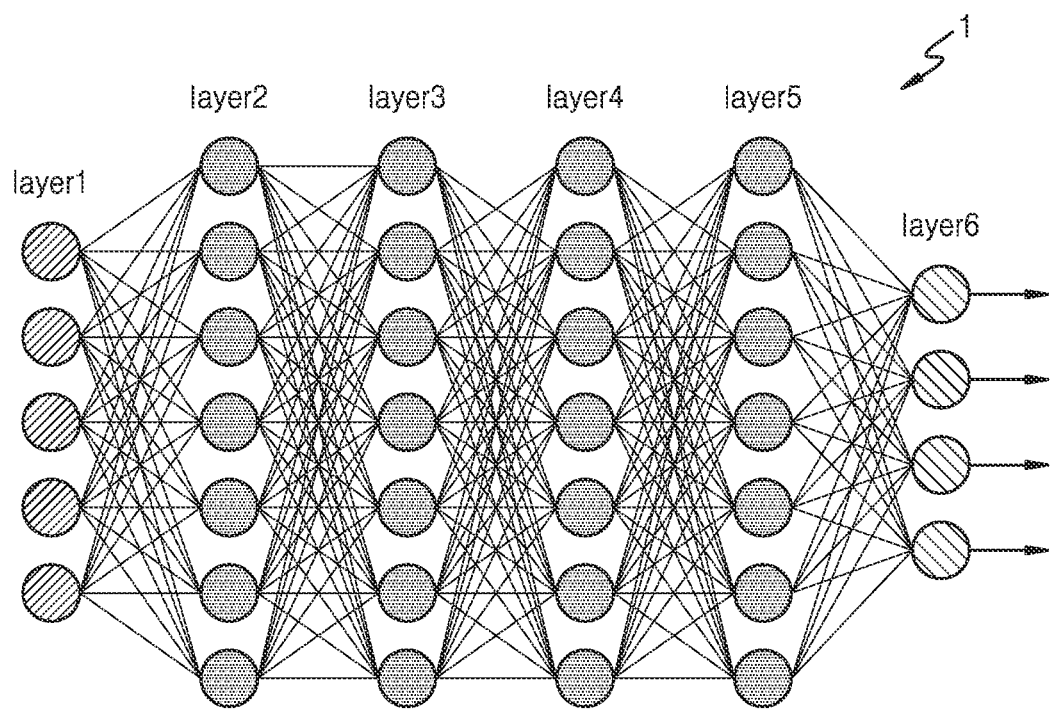
FIG. 1 is a diagram of a neural network architecture according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

In the description of embodiments, it will be understood that when a portion is referred to as being connected to another portion, it may be directly connected to the other portion or may be electrically connected to the other portion with an intervening element therebetween. It will be further understood that when a portion "includes" or "comprises" an element, unless otherwise defined, the portion may further include another element, not excluding the other element.

The term "include" or "comprise" used in examples should not be construed as necessarily including all of various elements or operations described herein, and some of the elements or operations may not be included or additional elements or operations may be further included.

The description of embodiments below should not be construed as limiting the appended claims, and what one of ordinary skill in the art would have been able to infer will be understood as being included in the appended claims. Examples only for illustration will now be described in detail with reference to the accompanying drawings. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Example neural networks described herein use a large number of nodes that may be connected by edges, e.g., by weighted connections, and/or that may apply trained kernels, e.g., in implemented convolutional operations. The neural networks are implemented through hardware or a combination of hardware and instructions, e.g., through instructions stored in a non-transitory memory of the image matching device, which when executed by one or more processors of the image matching device, cause the one or more processors to implement the neural networks. The trained neural networks may be stored in the memory of the image matching device in various structures. The various data structures may include storing the resulting trained parameters, e.g., including the trained connection weights and/or kernels, in vector, matrix, volume, or other single or multi-dimensional data structure. Also, though the apparatuses and methods are discussed using the example neural network structure, alternate machine learning structures may also be available in other examples. Thus, as described herein, one or more processors configured to implement such neural networks or neural network portions, or other machine learning structures, is inclusive of all such examples of such hardware and/or hardware/instruction implementations FIG. 1 is a diagram of a neural network architecture according to one or more embodiments.

Referring to FIG. 1, a neural network 1 may be a deep neural network (DNN). The DNN may be a convolutional neural network (CNN), a recurrent neural network (RNN), or the like but is not limited thereto. In a non-limiting example, the neural network 1 may be a DNN including an input layer Layer 1, four hidden layers Layer 2, Layer 3, Layer 4, and Layer 5, and an output layer Layer 6.

When the neural network 1 is a DNN, the neural network 1 may include many layers capable of processing information. Thus, the neural network 1 may process more complex data sets than a neural network including a single layer. Although the neural network 1 includes six layers in FIG. 1, this is merely an example, and the neural network 1 may include fewer or more layers. That is, the neural network 1 may include layers of various structures different from those shown in FIG. 1. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Figure 2:
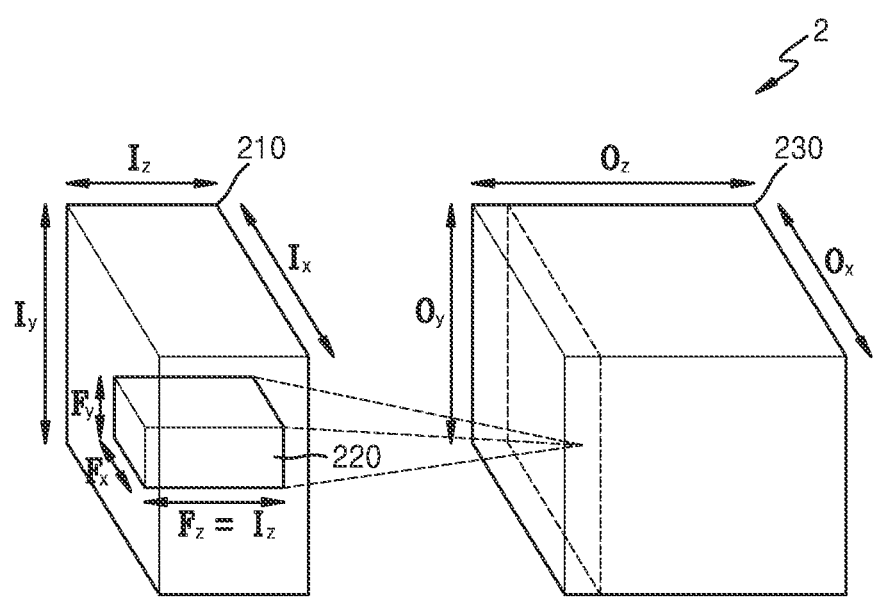
FIG. 2 is a diagram of a convolution layer according to one or more embodiments.

FIG. 2 is a diagram of a convolution layer according to one or more embodiments.

FIG. 2 illustrates a part of a convolution layer 2. A neural network may include a convolution layer, a pooling layer, a fully connected layer, and the like. Referring to FIG. 2, the convolution layer 2 may include an input activation map 210 having a size of Ix×Iy×Iz, a weight filter 220, e.g., a kernel, having a size of Fx×Fy×Iz, and an output activation map 230 having a size of Ox×Oy×Oz.

The input activation map 210, the weight filter 220, and the output activation map 230 may respectively include input activation values, weight values, and output activation values. The input activation map 210 may be convoluted with the weight filter 220, resulting in the output activation map 230. In an example, the weight filter 220 and the input activation map 210 may be operated in a sliding window manner. Specifically, input activations in a sliding window and weights in the weight filter 220 may be multiplied and added, respectively. The output activation map 230 may become the input activation map 210 again for a next layer and may be convoluted with the weight filter 220. Such a convolution operation may be repeatedly performed.

In an example, a plurality of weight filters 220 may be convoluted with the input activation map 210 to generate the output activation map 230.

The above-described operation may be expressed simply as a sum-of-products of input activations and weights. Equation 1 below may define a sum-of-products operation in which multiplications an input activation $a_i$ and a weight $w_i$, where i=1, . . . , N, are summed.

$$S = \sum_{i=1}^{N} a_i \times w_i \quad \text{[Equation 1]}$$

In Equation 1, $a_i$ denotes an i-th input activation, $w_i$ denotes an i-th weight, and S denotes a resultant value of the sum-of-products operation.

An input value of a rectified linear unit (ReLU) activation function in the neural network may be a resultant value of an operation in the convolution layer 2 or a fully connected layer. The ReLU activation function may be defined as f (x)=max (0, x). When an input value x is a negative number, the ReLU activation function may output 0. When the input value x is a positive number, the ReLU activation function may output the input value. Thus, when a sign of a final resultant value of the sum-of-products operation is known to be negative before the sum-of-products operation is completed, a computational amount may be reduced. An apparatus for processing data according to the disclosure may quickly determine whether an intermediate resultant value is a negative number before completing the sum-of-products operation is completed. Therefore, an operation speed of the apparatus may be improved. Hereinafter, a data processing apparatus according to an example will be described with reference to FIGS. 3A to 15C.

Figure 3A:
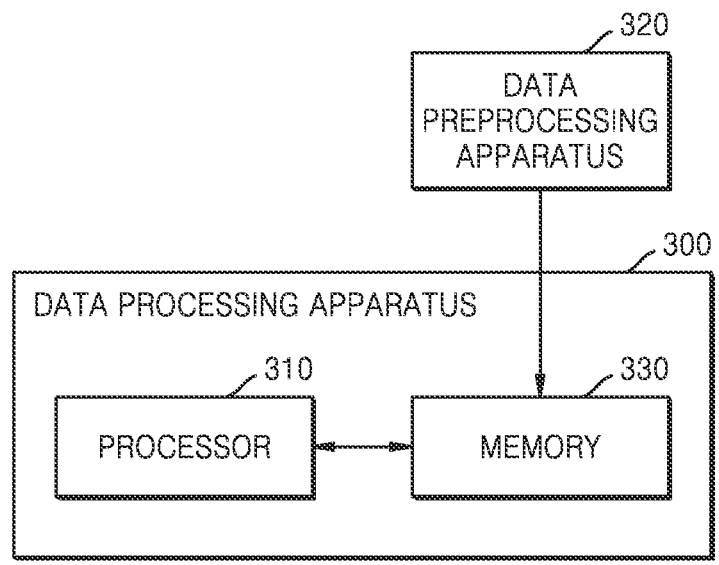
FIGS. 3A and 3B are block diagrams of a neural network apparatus according to one or more embodiments.
Figure 3B:
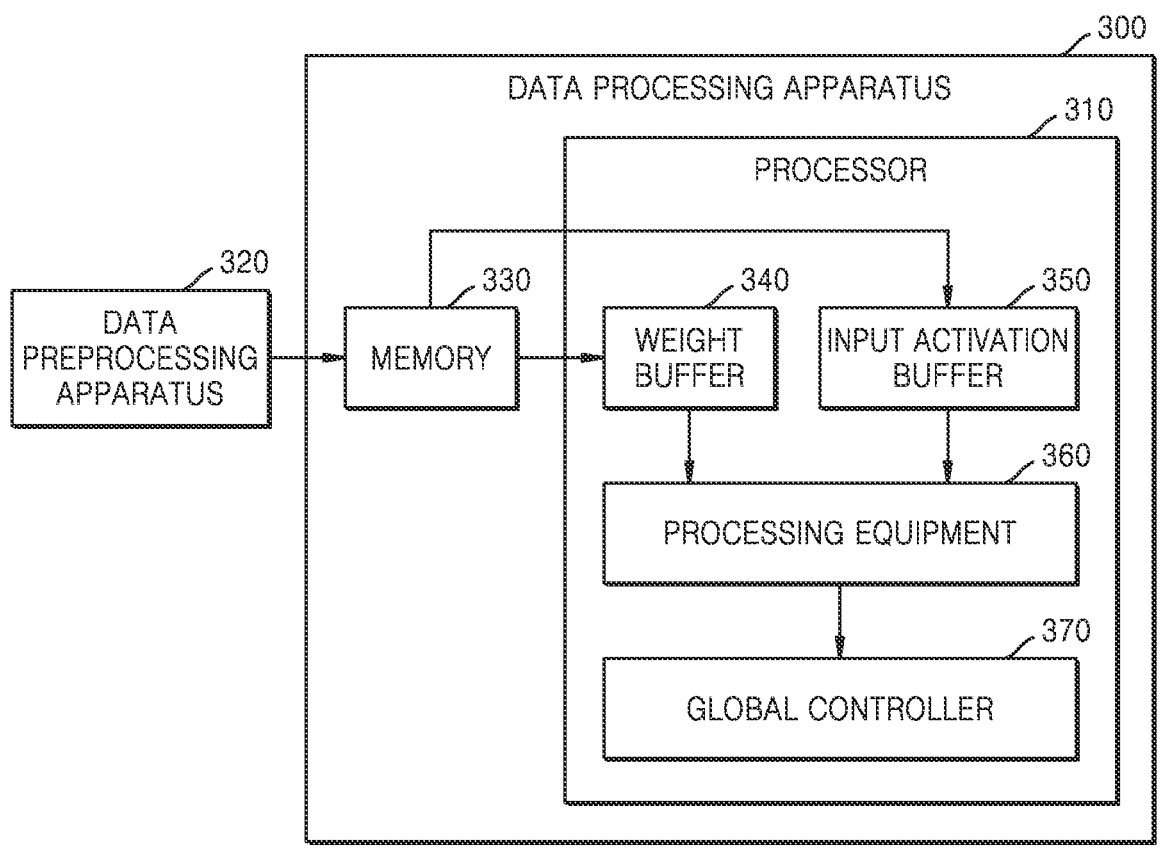

FIGS. 3A and 3B are block diagrams of a neural network apparatus.

Referring to FIGS. 3A and 3B, a neural network apparatus, such as a data processing apparatus 300 according to an example may be implemented by a personal computer (PC), a server device, a mobile device, an embedded device, and the like. In an example, the data processing apparatus 300 may be a smart phone, a tablet device, an augmented reality (AR) device, an Internet of things (IoT) device, an autonomous vehicle, a robotics device, a medical device that performs voice recognition, image recognition, image classification, etc. using a neural network, and the like, but is not limited thereto. Furthermore, the data processing apparatus 300 may correspond to an exclusive hardware accelerator mounted on the above-mentioned device. The data processing apparatus 300 may be a neural processing unit (NPU), which is an exclusive module for driving the neural network, a tensor processing unit (TPU), a hardware accelerator such as a neural engine, and the like, but is not limited thereto.

Referring to FIG. 3A, the data processing apparatus 300 may include a processor 310 and memory 330. In examples, it is apparent, after an understanding of the present application, that the data processing apparatus 300 may further include general components in addition to and/or other than the components shown in FIG. 3A.

The processor 310 may process weight data and input activation data using a bit-serial scheme. The processor 310 may be implemented as a central processing unit (CPU), a graphics processing unit (GPU), an application processor (AP), and the like, but is not limited thereto.

The memory 330 may store data processed in the data processing apparatus 300 and data to be processed. In an example, the memory 330 may store input activation data, weight data, and the like. The memory 330 may be random access memory (RAM) such as dynamic random access memory (DRAM), static random access memory (SRAM), etc., read-only memory (ROM), electrically erasable programmable read-only memory (EEPROM), CD-ROM, blu-ray or other optical disk storage, a hard disk drive (HDD), a solid state drive (SSD), or flash memory, but is not limited thereto.

The processor 310 may read/write the data processed in the data processing apparatus 300, for example, input activation data, weight data, output activation data, etc. from/to the memory 330 and execute operations of the data processing apparatus 300 using the read/written data. In an example, the processor 310 may perform a sum-of-products operation on the input activation data and the weight data using the bit-serial scheme. Unlike the neural network 1 shown in FIG. 1, an actual neural network driven by the data processing apparatus 300 may have a very complicated architecture. Accordingly, the processor 310 may perform a very large sum-of-products operation.

To reduce the computational amount, weight values included in a weight filter may undergo a preprocessing process. The weight values may be encoded in an inverted two's complement fixed-point format and may be blocked using values corresponding to same positions of the encoded weight values included in a plurality of filters. A data preprocessing apparatus 320 may perform blocking of the weight values, and the weight values that undergo the preprocessing process may form weight data. In an example, the data preprocessing apparatus 320 may be a CPU, but is not limited thereto.

FIG. 3B illustrates components of the processor 310 according to an example. The processor 310 may include a plurality of pieces of processing equipment (PEs) 360, a weight buffer (WB) 340, an input activation buffer or node buffer (NB) 350, and a global controller 370.

In examples, it is apparent, after an understanding of the present application, that the data processing apparatus 300 may further include general components other than the components shown in FIG. 3B.

The PEs 360 may perform operations on the weight data and the input activation data. The WB 340 may store weight data to be processed. The NB 350 may store the input activation data. The global controller 370 may determine an intermediate resultant value of the operations, dynamically determine next weight data received by the PEs 360, and output a final resultant value of a sum-of-products operation with respect to the weight data and the input activation data.

The processor 310 may read the weight data from the memory 330, write the read weight data to the WB 340, read the input activation data, and write the read input activation data to the NB 350. In an example, the WB 340 and the NB 350 may include SRAM, STT-RAM, or embedded DRAM.

The processor 310 may write data to be used for the operation among the input activation data to an input activation register included in the PEs 360. (An example of the input activation register may be input activation register 1002, which will be described below with reference to FIG. 10A.) The PEs 360 may be connected to one another in a tree form to obtain a sum of input activations based on the weight data generated using values corresponding to specific digit positions of weights. The global controller 370 may process a result of the sum-of-products operation with respect to the weight of the filter and the input activations in a bit-serial scheme over several cycles using the sum of input activations. In an example, when it is determined via a fast negative determination technique that a sign of the intermediate resultant value is negative, an operation of the filter may be stopped, and sum-of-products of a weight of a next filter and the input activation may be processed. The fast negative determination technique will be described below with reference to FIG. 6. The result of the sum-of-products operation with respect to the weights of the filter and the input activations may be written to the memory 330.

Since the sum-of-products operation in the bit-serial scheme is performed through various stages in an adder tree form, each component included in the processor 310 may operate in a pipeline manner to improve a data throughput. Also, the PEs 360, the WB 340, a data network, and the global controller 370 may operate in a pipeline manner. At each stage of a pipeline operation, a result of a sum of the input activations may be updated based on the weight data generated using the weight values included in the different filters. This is to prevent an unnecessary operation because when the intermediate resultant value of sum-of-products operation is a negative number, it is unnecessary to further perform an operation on the filter. However, exceptionally, the result of the sum of input activations may be updated based on weight data generated using weight values of other digits included in the same filter to improve the throughput of a pipeline.

In an example, the data processing apparatus 300 may perform a function of a general multi-input product sum PE that performs a multiplication operation as an adder and a shifter.

Although not shown in FIG. 3B, the data processing apparatus 300 may include a network on chip to which a plurality of processors 310 are connected.

Referring back to FIG. 3A, the data preprocessing apparatus 320 may encode the weight values. Hereinafter, an example in which the data preprocessing apparatus 320 may encode the weight values is described with reference to FIG. 4.

Figure 4:
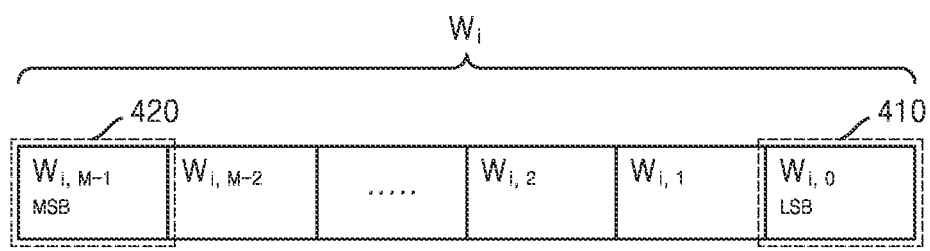
FIG. 4 is a diagram of an example of an encoded weight according to one or more embodiments.

FIG. 4 is a diagram of an encoded weight $W_i$ according to an example.

A fixed-point format is a method of expressing a numerical value by assuming that a position of a decimal point is fixed. Referring to FIG. 4, the weight $W_i$ may be encoded in a two's complement fixed-point format, $W_{i,0}$ of a $0^{th}$ position 410 may be a bit corresponding to a least significant bit (LSB) of the weight Wi, and $W_{i,M-1}$ of an $M-1^{th}$ position 420 may be a bit corresponding to a most significant bit (MSB) of the weight $W_i$. In this regard, in the case of a general two's complement fixed-point format, the weight $W_i$ may be encoded so that the MSB is a negative number and digits in remaining positions are positive numbers. Therefore, when the weight $W_i$ is encoded in the general two's complement fixed-point format, the weight $W_i$ may be expressed according to Equation 2 below.

$$w_i = \sum_{j=0}^{M-1} s_j \times w_{i,j} \times 2^j, \; s_j = \begin{cases} -1, & \text{if } j = M-1 \\ 1, & \text{if } j \neq M-1 \end{cases} \quad \text{[Equation 2]}$$

In Equation 2 above, $S_j$ denotes a code corresponding to a jth digit of the weight, and $W_{i,j}$ denotes a bit corresponding to the jth digit of the weight $W_i$.

However, in the case of an inverted two's complement fixed-point format, the weight $W_i$ may be encoded so that the MSB is a positive number and digits in remaining positions are negative numbers (e.g., where the MSB being zero indicates a negative number). When the weight $W_i$ is encoded in the inverted two's complement fixed-point format, the weight $W_i$ may be expressed as Equation 3 below.

$$w_i = \sum_{j=0}^{M-1} s_j \times w'_{i,j} \times 2^j, \; s_j = \begin{cases} 1, & \text{if } j = M-1 \\ -1, & \text{if } j \neq M-1 \end{cases} \quad \text{[Equation 3]}$$

In Equation 3 above, $S_j$ denotes a code corresponding to a jth digit of the weight, $W'_{i,j}$ denotes a bit corresponding to the jth digit of the weight $W_i$.

Figure 5A:
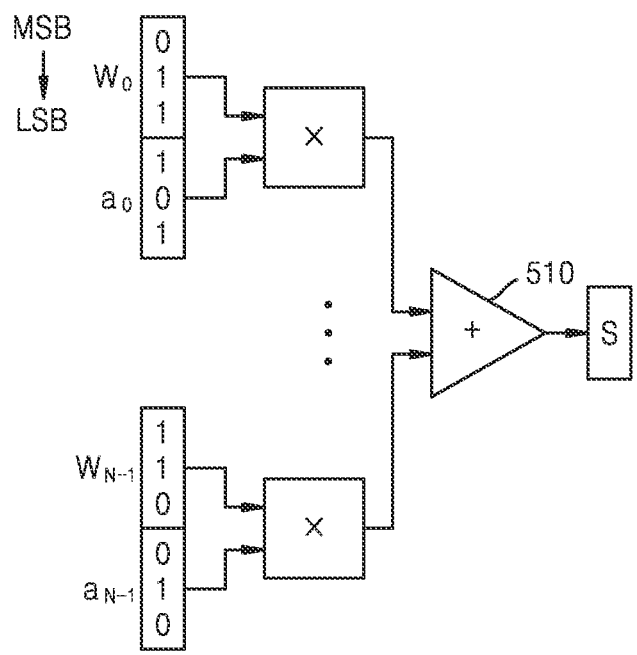
FIGS. 5A and 5B are diagrams of activation operations with respect to encoded weights and input activations according to one or more embodiments.
Figure 5B:
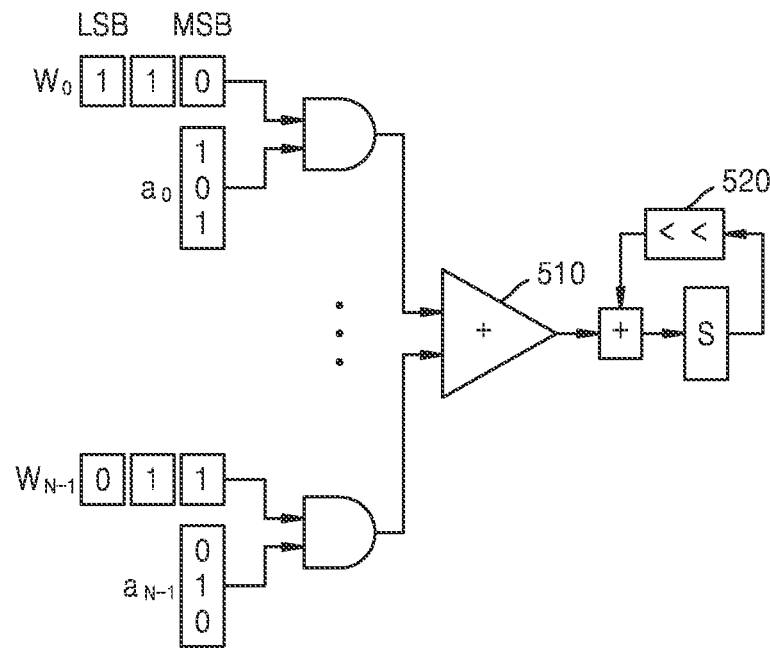

FIGS. 5A and 5B are diagrams of activation operations regarding encoded weights and input activations according to one or more embodiments.

Referring to FIGS. 5A and 5B, it is assumed that weight values are encoded in a two's complement fixed-point format. FIG. 5A illustrates an operation of performing multiplication between respective weights and input activations and then sending resultant values as an input to an adder 510.

FIG. 5B illustrates a bit-serial operation. The processor 310 may serialize the weights using the operation of FIG. 5B and sequentially use bits corresponding to a LSB from a MSB of the weights in a sum-of-products operation. In an example, based on weighting bits corresponding to each MSB from weights $W_0$ to $W_{N-1}$, it may be determined whether each of input activations $a_0$ to $a_{N-1}$ is to be input to the adder 510. Since a bit corresponding to the MSB of $W_0$ is 0, $a_0$ may not be inputted to the adder 510. Since a bit corresponding to the MSB of $W_{N-1}$ is 1, $a_{N-1}$ is input to the adder 510. All of the input activations input to the adder 510 may be added to determine an intermediate resultant value S. Thereafter, the intermediate resultant value S may be shifted by one digit position through a shifter 520. The intermediate resultant value S processed by the shifter 520 may be added to the intermediate resultant value S generated based on the weight bits corresponding to a digit position of an MSB from the weights $W_0$ to $W_{N-1}$. When the same procedure is repeated from the LSB of the weights $W_0$ to $W_{N-1}$, the final resultant value S of a sum-of-products operations on the input activations $a_0$ to $a_{N-1}$ and the weights $W_0$ to $W_{N-1}$ may be determined.

Unlike the operation described with reference to FIG. 5A, the operation described above with reference to FIG. 5B is advantageous in that the adder 510 and the digit shifter 520 are used without using a multiplier, e.g., only the adder 510 and the digital shifter 520.

Figure 6A:
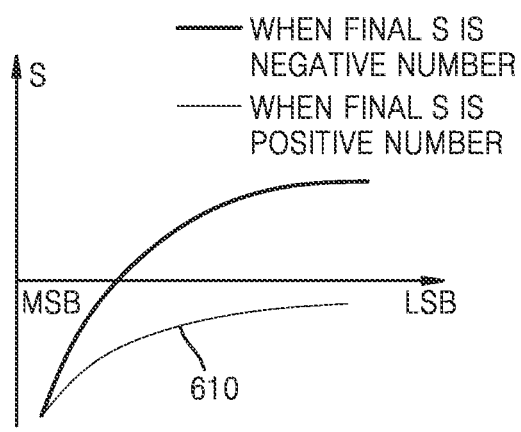
FIGS. 6A and 6B are diagrams showing changes in activation results according to weight digit position according to one or more embodiments.
Figure 6B:
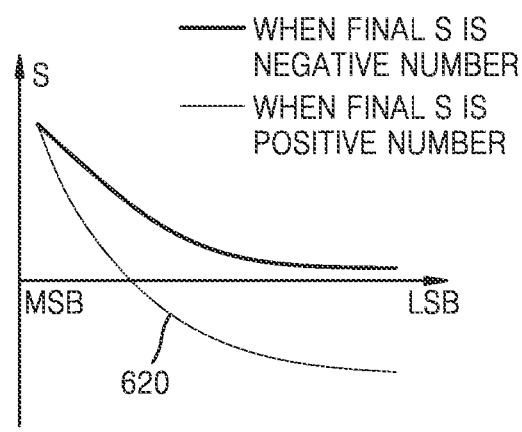

As described above with reference to FIG. 5B, the bit-serial operation may be used in the disclosure to perform the sum-of-products operations. FIGS. 6A and 6B illustrate changes of activation results according to a digit of an encoded weight when the bit-serial operation is used according to examples.

FIGS. 6A and 6B show a change in an operation result according to a change in a weight digit position used in an operation according to an embodiment.

A value of an input activation may be a value that passed through the ReLU activation function in a previous layer, and thus the value is 0 or a positive number.

Referring to FIG. 6A, since a MSB of a weight encoded in a general two's complement fixed-point format is a negative number, an operation result with respect to an input activation that is a positive number and a bit corresponding to the MSB of the weight may be always a negative number. Then, since operation results of the input activation and bits of digits other than the MSB of the weight are positive numbers, a resultant value (hereinafter referred to as 'S') of the operation may gradually increase as shown in FIG. 6A since the operation results are accumulated.

On the other hand, referring to FIG. 6B, since a MSB of a weight encoded in an inverted two's complement fixed-point format is a positive number, an operation result with respect to an input activation that is a positive number and a bit corresponding to the MSB of the weight may be always a positive number. Then, since a product of bits of digits other than the MSB of the weight and the input activation is a negative number, S may gradually decrease as shown in FIG. 6B since the operation results are accumulated.

When a weight is encoded in the general two's complement fixed-point format, even in a case 610 where a final resultant value of the operation is a negative number, it may not be possible to determine whether a result of a sum-of-products operation is a negative number until the sum-of-products operation is completed.

However, when the weight is encoded in the inverted two's complement fixed-point format, in a case where the final resultant value of the operation is the negative number, a sign of S may change to negative at a certain point during the operation from a MSB to a LSB of the weight. That is, in a case 620, it can quickly be determined where a sign of the final resultant value of the sum-of-products operation is a negative number without needing to complete the sum-of-products operation.

When it is determined that the sign of S is negative in an operation process, the processor 310 may output 0 and stop the operation without having to use a bit of a next digit position of a filter weight.

Figure 7:
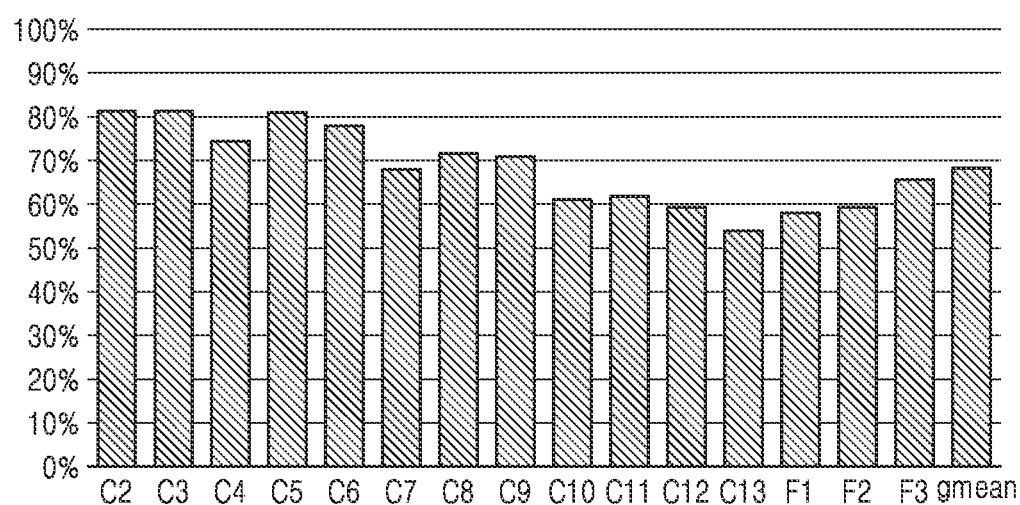
FIG. 7 is a diagram illustrating a result of a reduction in processing operations when a fast negative determination technique is applied according to one or more embodiments.

FIG. 7 is a graph illustrating a result of a reduction in processing operations required for an operation when a fast negative determination technique is applied, according to one or more embodiments.

The graph shown in FIG. 7 is according to experimental results obtained in the case of a VGG-16 neural network, which is a deep convolutional network including 13 convolution layers C1 to C13 and 3 fully-connected layers F1 to F3. The graph shown in FIG. 7 refers to each layer constituting the neural network. Referring to FIG. 7, it is experimentally confirmed that an average number of addition steps is reduced (gmean) by 30.2%. In other words, when the processor 310 utilizes the operation of FIG. 6B, a computational amount decreases.

Figure 8A:
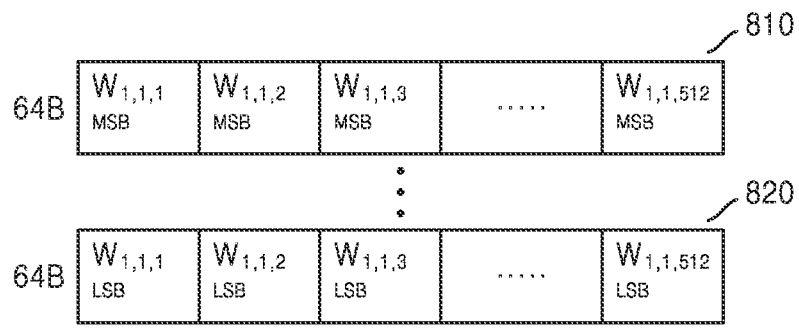
FIGS. 8A and 8B are diagrams of weight data stored in memory according to one or more embodiments.
Figure 8B:
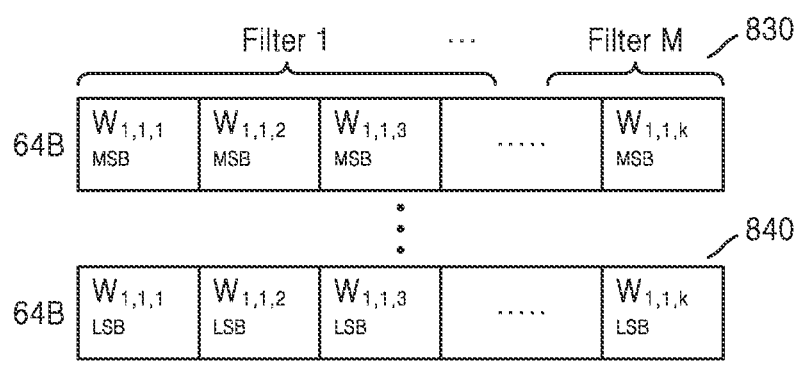
Figure 8C:
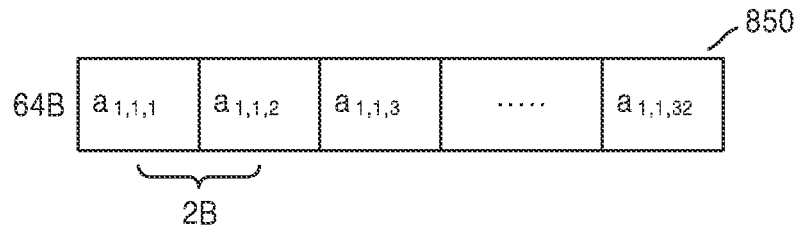
FIG. 8C is a diagram of input activation data stored in memory according to one or more embodiments.

FIGS. 8A and 8B are diagrams of weight data stored in memory according to one or more embodiments. FIG. 8C is a diagram of input activation data stored in memory according to one or more embodiments.

The weight data may be input to the memory 330 after a preprocessing process is performed in the data preprocessing apparatus 320. The data preprocessing apparatus 320 may encode a plurality of weights using an inverted two's complement fixed-point format. Thereafter, the data preprocessing apparatus 320 may generate the weight data using values corresponding to the same positions of encoded weights included in each of a plurality of filters.

In an example, the data preprocessing apparatus 320 may collect values corresponding to the same positions of weights which are included in one filter and have the same x and y coordinates to generate blocks. For example, referring to FIG. 2, the data preprocessing apparatus 320 may collect each weight value in filter 220 having a same x and y coordinate and generate a plurality of blocks respectively corresponding to MSBs and LSBs of the weight values. The blocks may form the weight data.

Referring to FIG. 8A, according to an example, a first block 810 may be a collection of bits corresponding to a MSB of which weights have all x and y coordinates equal to 1 and z coordinates equal to 1 to 512. A second block may be a collection of bits corresponding to a MSB next position of which weights have all x and y coordinates equal to 1 and z coordinates equal to 1 to 512. A last block 820 may be a collection of bits corresponding to a LSB of which weights have all x and y coordinates equal to 1 and z coordinates are equal to 1 to 512. In an example, when one block of the weight data is 64 bytes (512 bits) and one weight is 2 bytes (16 bits), the data preprocessing apparatus 320 may generate 16 weight data blocks using 512 weight values.

Referring to FIG. 8B, according to an example, the data preprocessing apparatus 320 may generate the weight data by collecting values corresponding to the same positions of the same weight values included in various filters other than one filter and having the same x and y coordinates. When a z dimension of a filter is not large enough to form a weight block, weighted blocks may be formed using the weights included in various filters.

FIG. 8B shows weight blocks when one block of weight data is 64 bytes (512 bits) and the z dimension of the filter is smaller than 512. A first block 830 may be a collection of bits corresponding to a MSB of each of weights in which x, y coordinates included in a Filter 1 to a Filter M are all 1. A second block may be a collection of bits corresponding to a MSB next position of each of weights in which x, y coordinates included in the Filter 1 to the Filter M are all 1. A last block 840 may be a collection of bits corresponding to a LSB of each weights have all x and, y coordinates equal to 1.

Referring to FIG. 8C, the data preprocessing apparatus 320 may collect input activation values and generate blocks to form the input activation data. An input activation block 850 may group activations included in, referring to FIG. 2 for example, an input activation map 210 and having the same x and y coordinates. Referring to FIG. 8C, according to an example, the data preprocessing apparatus 320 may collect activations of which all x and y coordinates are equal to 1 and z coordinates are equal to 1 to 32 to form a block. When one input activation is 2 bytes and an activation block is 64 bytes, the one activation block may include 32 pieces of activation information.

The sizes of the weight block and the input activation block 850 are not limited to 64 bytes as shown in FIG. 8, but may vary.

Figure 9:
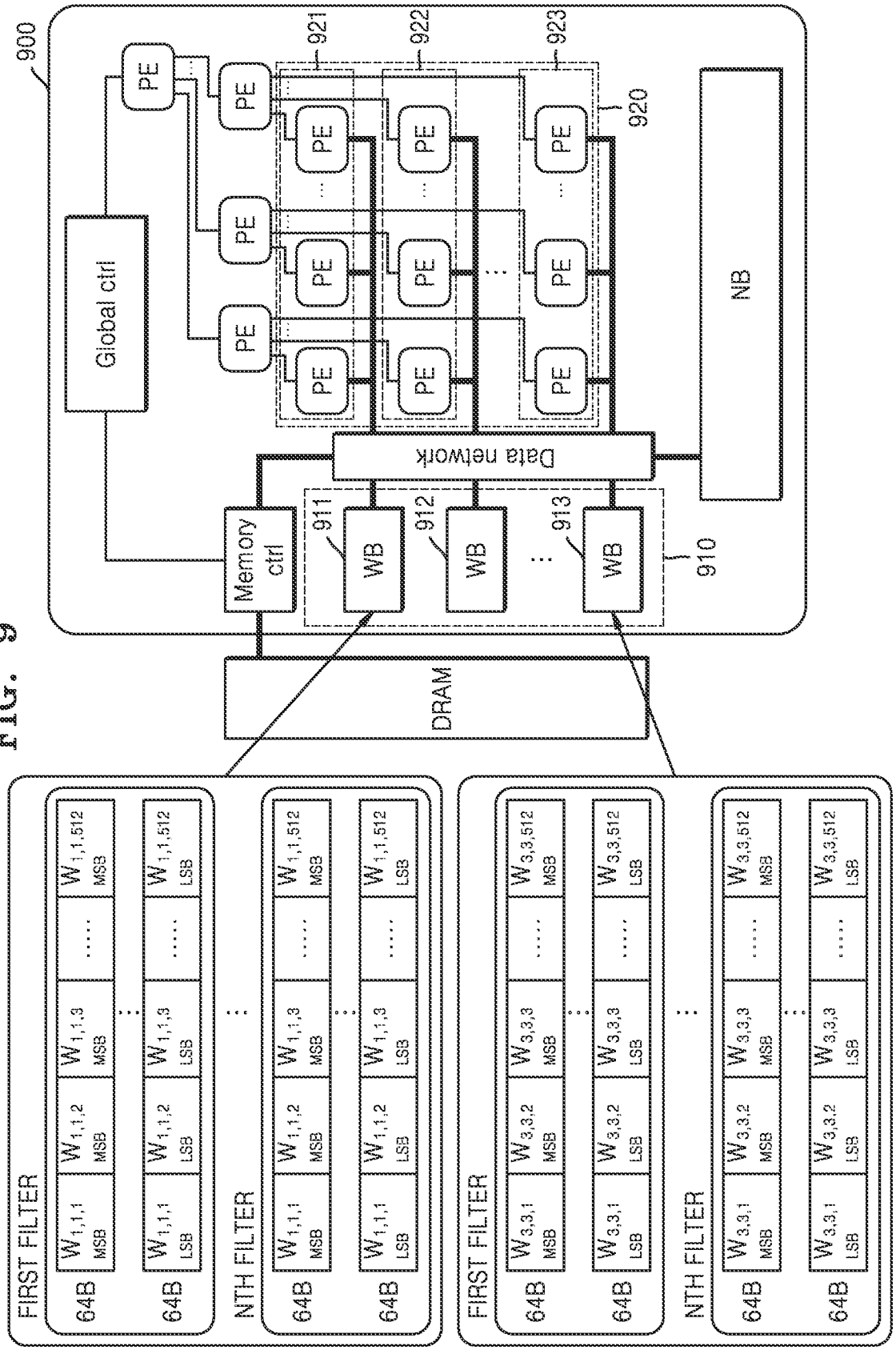
FIG. 9 is a diagram of a format of weight data stored in a weight buffer according to one or more embodiments.

FIG. 9 is a diagram of a format of weight data stored in a weight buffer (WB) 910, according to an example.

The WB 910 may store weight data blocks to be used in a row 920 of a PE matrix connected to the WB 910. The WB 910 of FIG. 9 may correspond to the WB 340 of FIG. 3B and the row 920 of FIG. 9 may correspond to the PEs 360 of FIG. 3B. A processor 900 may correspond to the processor 310 of FIG. 3B. Since one WB 910 is connected to the row 920 of one PE matrix, the number of WBs 910 may be equal to the number of rows 920 of one PE matrix. In an example, when (x, y) coordinates (e.g., positions) of a filter are from (1,1) to (3,3) (referring to FIG. 2 for example, if F=3 for the weight filter 220 having the size of Fx×Fy×Iz), there are 9 WBs 910, and 9 rows 920 of the PE matrix connected to each WB 910 may be also present. In an example, a first WB 911 may be connected to a first row 921 of the PE matrix, but may also be connected to any one or any combination of any two or more of the first row 921, a second row 922, a last row 923, and any other row 920 of the PE matrix according to a connection method. Similarly, a second WB 912 and a last WB 913 may be respectively connected to the second row 922 and the last row 923, or may be connect to any one or any combination of any two or more of any row 920 of the PE matrix.

FIG. 9 shows weight blocks stored in each WB 910. The first WB 911 may store blocks obtained by blocking bits corresponding to a LSB from a MSB of each of weights in which x and y coordinates are all 1 and z coordinates are 1 to 512 with respect to n filters. In this example where the (x, y) coordinates of the filter are (1, 1) to (3, 3), a last ninth WB 913 may store blocks obtained by blocking bits corresponding to a LSB from a MSB of each of weights in which x and y coordinates are all 3 and z coordinates are 1 to 512 with respect to the n filters.

As described above with reference to FIG. 8, the size of a weight block is not limited to 64 bytes (512 bits), and the weight block may be formed using weights included in various filters rather than one filter. The number of WBs 910 may vary according to x and y coordinate values of the filter.

In addition, the size of the WB 910 may be reduced by placing a large global buffer in the data processing apparatus 300. In an example, weight values may be stored in the global buffer and copies and reused in the WB 910 again.

Figure 10A:
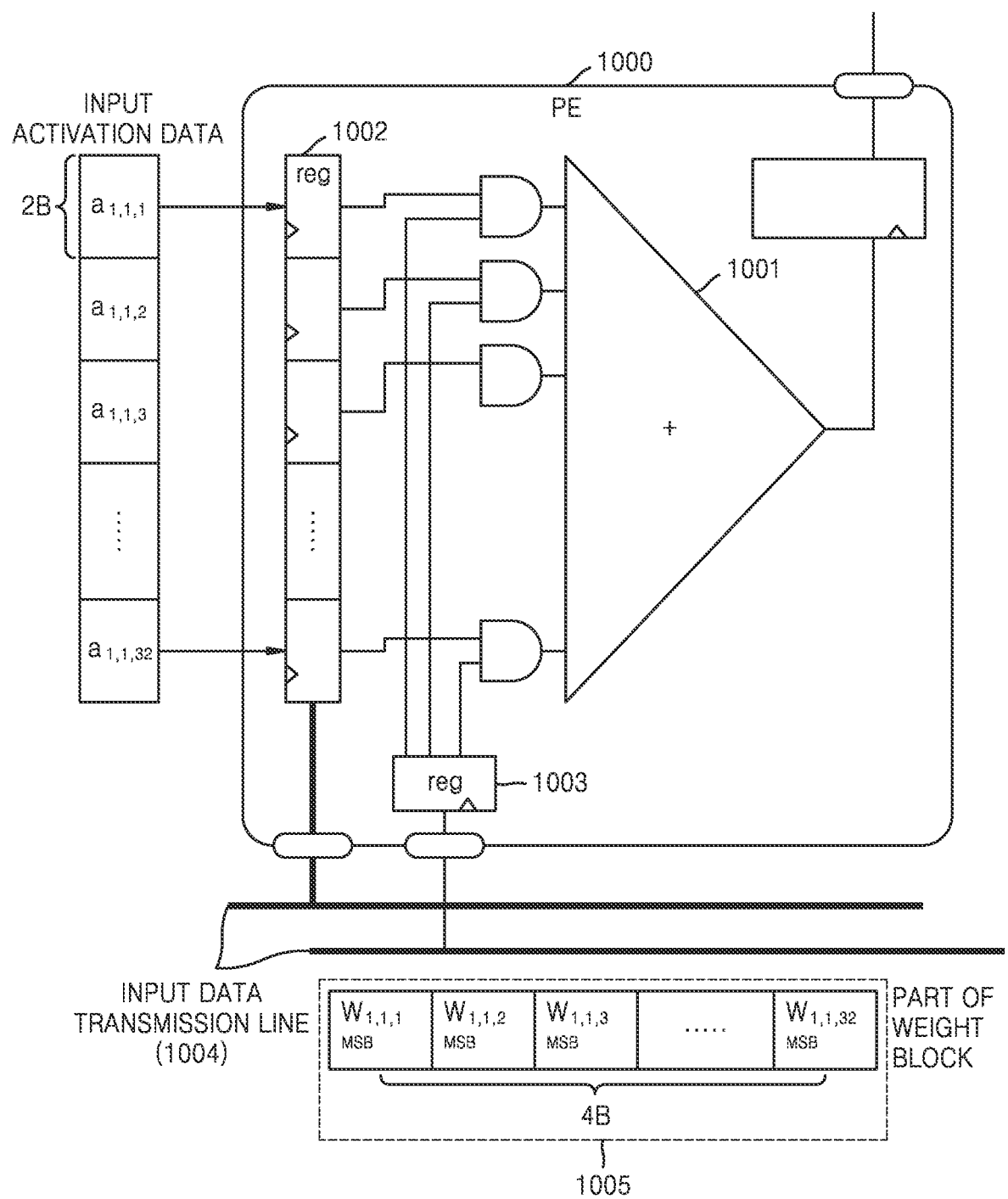
FIG. 10A is a diagram of an activation method using processing equipment (PE) according to one or more embodiments.
Figure 10B:
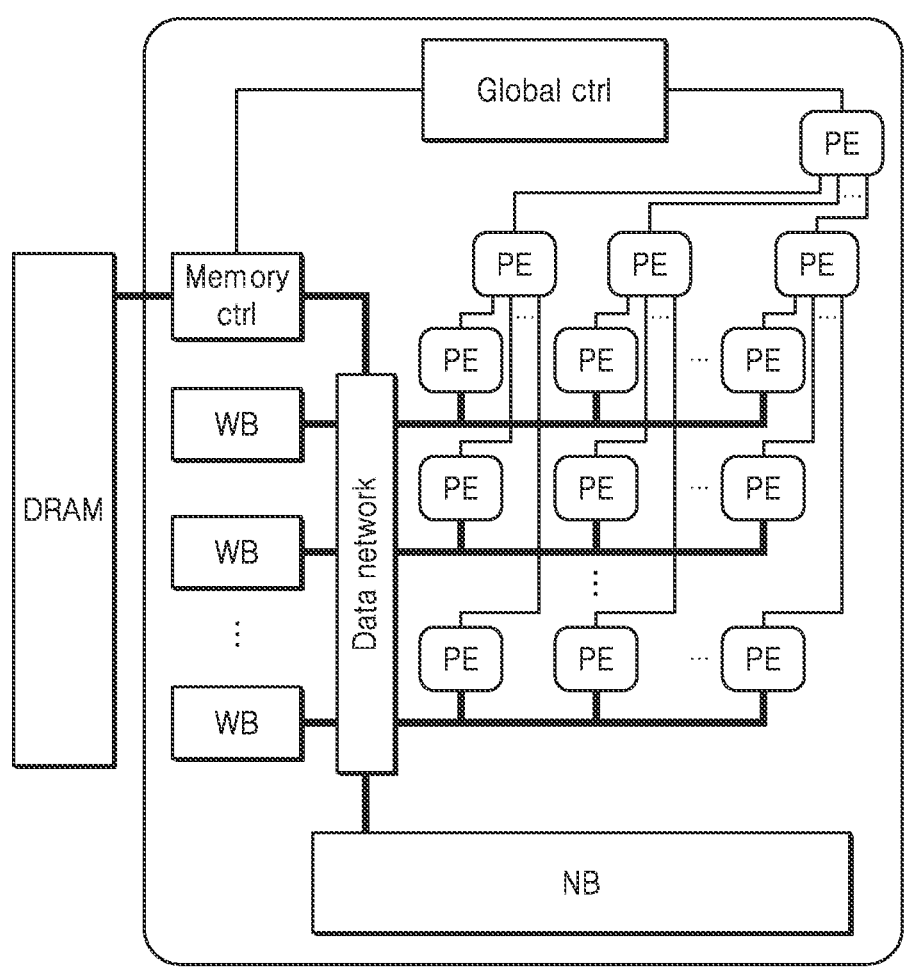
FIG. 10B is a diagram of a PE arrangement method according to one or more embodiments.

FIG. 10A is a diagram of an activation method using processing equipment (PE) according to one or more embodiments. FIG. 10B is a diagram of a PE arrangement method according to one or more embodiments.

The PE 1000 may include a multiple input adder tree 1001, input activation registers 1002, and a weight register 1003. The PE 1000 of FIG. 10A may correspond to the PE 360 of FIG. 3B.

The input activation registers 1002 may store a plurality of input activation data. The weight register 1003 may store weight bits. The weight bits may determine whether each input activation is to be input to the multiple input adder tree 1001. The weight register 1003 may store a portion 1005 of a weight data block. The size of the weight register 1003 may be determined by the number of inputs of the multiple input adder tree 1001 in the PE 1000.

Referring to FIG. 10A, 32 input activations of 2 bytes may be stored in each of the input activation registers 1002. The weight register 1003 may store weight bits of 4 bytes (32 bits) which is a part of a weight block of 512 bits. That is, the weight block of 512 bits (64 bytes) may be stored in the weight register 1003 of the 16 PEs 1000 located in one row of a PE matrix by 4 bytes (32 bits). Each of the weight bits (32 bits) located in the weight register 1003 may determine whether the 32 input activations located in the input activation registers 1002 are to be input to the multiple input adder tree 1001.

The sizes of the input activation, the input activation register 1002, and the weight register 1003 are not limited to sizes shown in FIG. 10A, and may have various values. Also, the number of PEs 1000 located in one row of the PE matrix is not limited and may have various values.

An input data transmission line 1004 connected to an input port of the PE 1000 may transfer input activation blocks from the input activation buffer 350 to the input activation register 1002. The input data transmission line 1004 may transfer an activation block to be input to the input activation register 1002 in the PE 1000 at a time. Therefore, to transfer the input activation block to all the PEs 1000 in the row 920 of the PE matrix, a cycle as many as the number of the PEs 1000 arranged in one row may occur. Also, the input data transmission line 1004 of the PE 1000 may transfer weight data blocks in the WB 340. One weight block may be transferred to the row 920 of the PE matrix and divided and stored in the weight registers 1003 of each of the PEs 1000 in the row 920. Therefore, one cycle may occur to transfer the weight bits to all the PEs 1000 in the row 920 of the PE matrix.

Referring to FIG. 10B, the PEs 1000 may be formed in a 2D array and connected not only in a row direction but also in a column direction. The PEs 1000 may be connected in the column direction to form an adder tree. Input units of the PEs 1000 located at an upper portion may be connected to output units of the PEs 1000 located at a lower portion of the tree. The PE trees in the column direction may be combined by the uppermost PE 1000 connected to the global controller 370. The uppermost PE 1000 may be one as shown in FIG. 10B, or may be plural. As described above, the weight data may be included in various filters other than one filter and may be generated by collecting values corresponding to the same digit of weights having the same x and y coordinates. In this case, the uppermost PE 1000 connected to the global controller 370 to obtain a final resultant value of an operation for each filter may be plural, and each of the uppermost PEs 1000 may form a single tree.

Figure 11A:
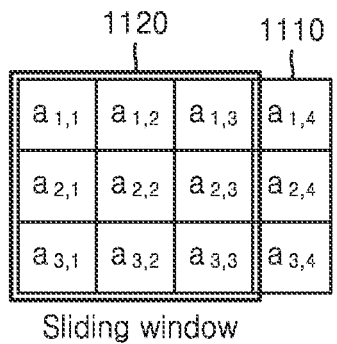
FIGS. 11A and 11B are diagrams of a data network capable of matching rows of a weight buffer with a PE matrix in a 1:1 correspondence according to one or more embodiments.
Figure 11A:
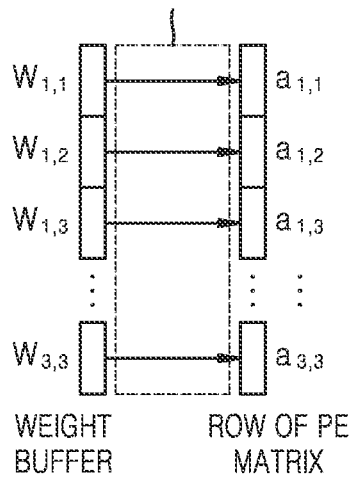
Figure 11B:
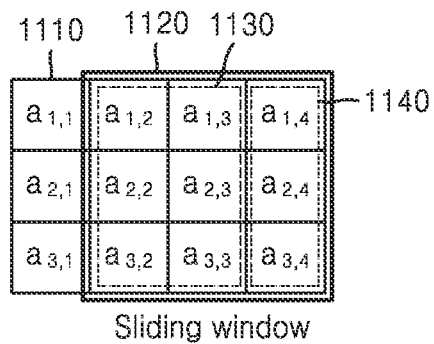
Figure 11B:
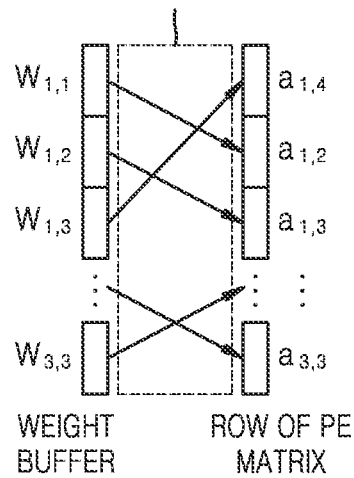

FIGS. 11A and 11B are diagrams of a data network that matches rows of a weight buffer and a PE matrix in a 1:1 correspondence according to examples.

The data network may connect the WBs 910 and the rows 920 of PE matrices. A sliding window 1120 may move on an input activation map 1110 of FIG. 11A to set a connection combination of the WBs 910 and the rows 920 of PE matrices. Since each of input activation block $a_{1,1}$, $a_{1,2}$, ... is divided and stored in the PEs 1000 in the row 920 of one PE matrix, each of the input activation blocks $a_{1,1}$, $a_{1,2}$, ... may indicate the row 920 of the PE matrix.

When a sum-of-products operation is completed according to the connection combination of FIG. 11A, the sliding window 1120 may move as shown in FIG. 11B. Since the sliding window 1120 moves, newly necessary input activation blocks 1140 may be transferred from the input activation buffer 350 and stored in the input activation registers 1002. Even when the sliding window 1120 moves, input activation blocks 1130 may be reused as they are by simply changing the connection combination of the WB 910 and the row 920 of the PE matrix.

Figure 12:
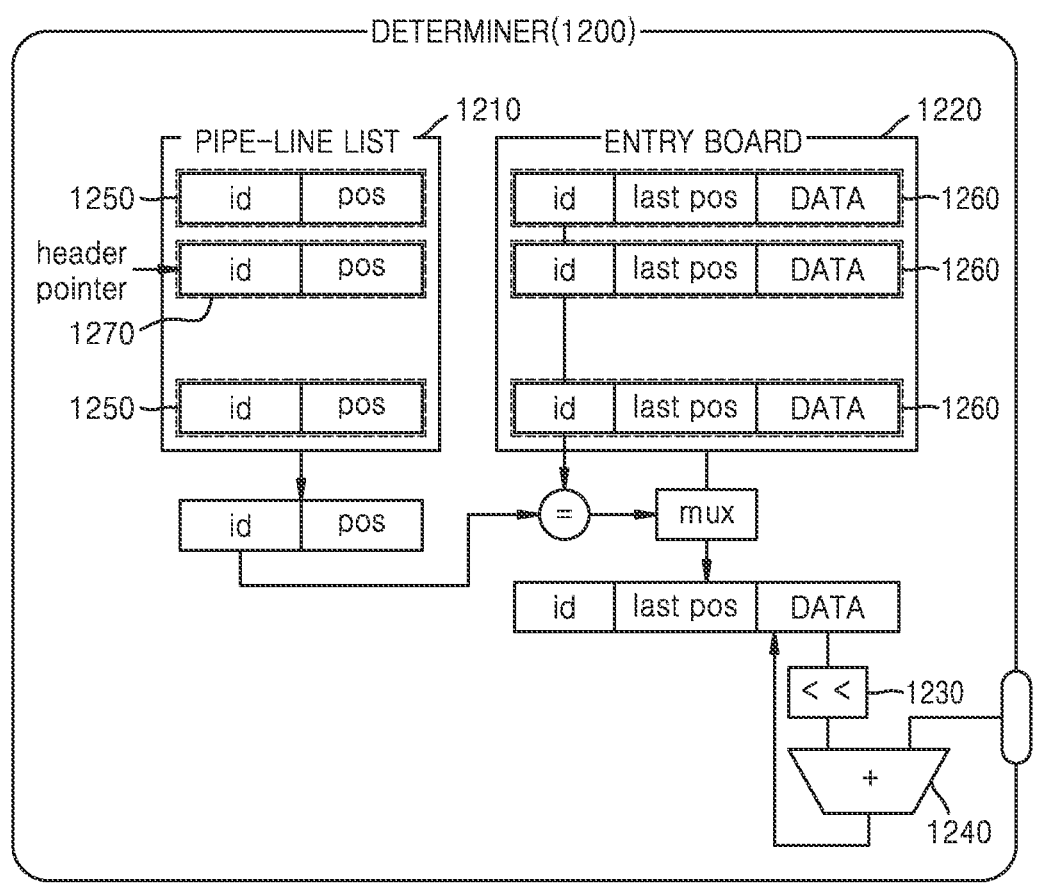
FIG. 12 is a diagram of a global controller according to one or more embodiments.

FIG. 12 is a diagram of the global controller 370 according to an example.

The global controller 370 may include at least one determiner 1200. Referring to FIG. 12, the determiner 200 may include a pipeline list 1210, an entry board 1220, a shifter 1230, and an adder 1240. A list entry 1250 of the pipeline list 1210 refers to each of boxes including id and pos in FIG. 12. Each list entry 1250 may indicate what operation is being performed in a corresponding pipeline stage. Also, id may indicate which filter weights of weight data used in the operation in the corresponding pipeline stage are included in. In addition, pos may indicate whether weights included in a corresponding filter are generated using values corresponding to which positions. Also, header pointer may indicate the list entry 1250 connected to the determiner 1200, i.e., of a final pipeline stage. The list entry 1250 indicated by header pointer is referred to as an output list entry 1270.

An entry 1260 of the entry board 1220 refers to each of boxes including id, last pos, and DATA. Also, id may indicate which filter weights of weight data used in the operation in the corresponding pipeline stage are included in. Last pos may indicate a last position of a plurality of pos of the list entries 1250 having a corresponding id in the pipeline list 1210. DATA may store an intermediate resultant value according to an operation of sum of product. A DATA value of the entry 1260 having id that matches id of the output list entry 1270 may be shifted one digit position by the shifter 1230 and added to an operation resultant value of a PE tree connected to the determiner 1200. In this manner, the determiner 1200 may perform an operation of sum of product of weight data and input activation data and output the final resultant value.

The determiner 1200 may determine the intermediate resultant value of the operation and dynamically determine next weight data received by the PE 1000 and output the final resultant value of the operation of sum of product of the weight data and the input activation data.

When the DATA value is not a negative number, the determiner 1200 may determine weight data generated using values corresponding to a next position of a corresponding filter under operation as a next input. When the DATA value is a negative number or the operation is completed up to a LSB of weights of the corresponding filter, weight data generated using values corresponding to a MSB position of a next filter may be determined as the next input.

As described above, the determiner 1200 may read an operation resultant value from the PE tree and accumulate the operation resultant value in DATA of the entry board 1220 to determine the intermediate resultant value of the sum-of-products operation in a bi-serial scheme. The determiner 1200 may determine whether the intermediate resultant value is a negative number, and output 0 when it is a negative number. When the intermediate resultant value is not a negative number, the determiner 1200 may determine whether the weight data finally used in the operation is generated by using values corresponding to which positions of the weight. In this regard, when the weight data finally used in the operation is the data generated by using values corresponding to LSB, the intermediate resultant value may be output as the final resultant value. When the weight data finally used in the operation is not the data generated by using values corresponding to LSB, the intermediate resultant value may be updated to DATA without outputting the final resultant value.

Figure 13:
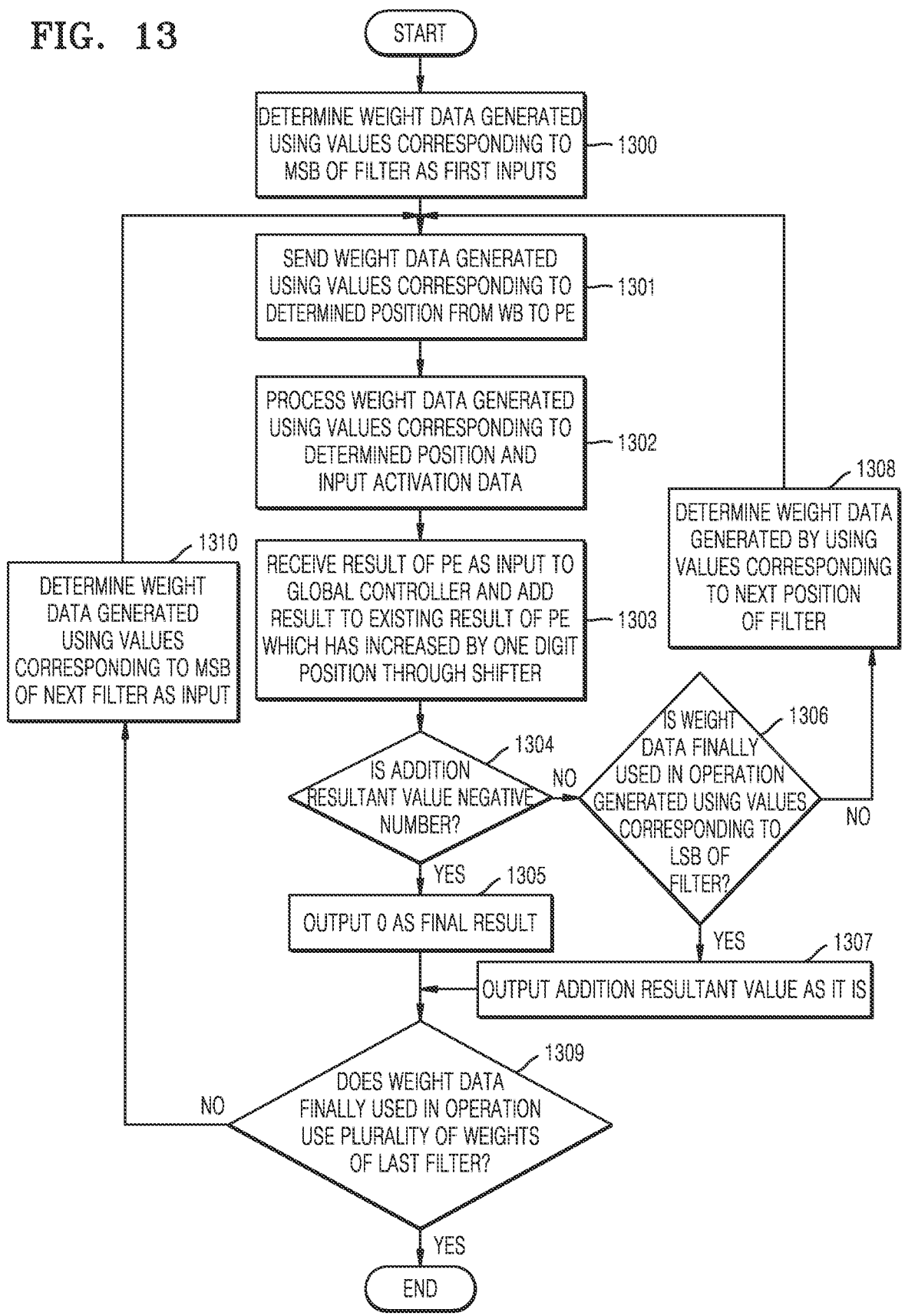
FIG. 13 is a flowchart of a neural network method including a sum-of-products operation according to one or more embodiments.

FIG. 13 is a flowchart of a neural network method including a sum-of-products operation according to one or more embodiments.

In operation 1300, the processor 310 may determine weight data generated using values corresponding to a MSB of a filter as a first input.

In operation 1301, the processor 310 may send weight data generated using values corresponding to a determined position from the WB 340 to the PE 360.

In operation 1302, the PE 360 of the processor 310 may process the weight data generated using the values corresponding to the determined position and the input activation data.

In operation 1303, the processor 310 may receive a result of the PE 360 as an input to the global controller 370 and add the result to an existing result of the PE 360 which has increased by one digit position by a shifter.

In operation 1304, the processor 310 may determine whether an addition resultant value is negative. When the addition resultant value is negative, a process may proceed to operation 1305. However, when the addition resultant value is not negative, the process may proceed to operation 1306.

In operation 1305, the processor 310 may output 0 as a final result. When it is determined that the addition resultant value is negative, since it is that the addition resultant value is negative number even when the operation is further advanced, 0 may be outputted as the final result to reduce a computational amount.

In operation 1306, the processor 310 may determine whether weight data finally used in the operation is generated using values corresponding to a LSB of the filter. When the weight data is generated using the values corresponding to the LSB of the filter, the process may proceed to operation 1307. Otherwise, the process may proceed to operation 1308.

In operation 1307, the processor 310 may output the addition resultant value as it is.

In operation 1308, the processor 310 may determine weight data generated by using values corresponding to a next position of the filter and return to operation 1301. That is, operations 1301 to 1308 may be repeated until the weight data generated using the values corresponding to the LSB of the filter are processed.

In operation 1309, the processor 310 may determine whether the weight data finally used in the operation uses a plurality of weights of a last filter. That is, the operation of the filter may be completed and 0 or a specific positive number may be output, and then the operation may be performed on the next filter. When the weight data finally used in the operation does not use the plurality of weights of the last filter, the process may proceed to operation 1310. When the weight data finally used in the operation uses the plurality of weights of the last filter, the operation ends.

In operation 1310, the processor 310 may determine the weight data generated using the values corresponding to the MSB of the next filter as an input and return to operation

1301. That is, operations 1301 to 1309 may be repeated until the operation on all the filters is completed.

Figure 14:
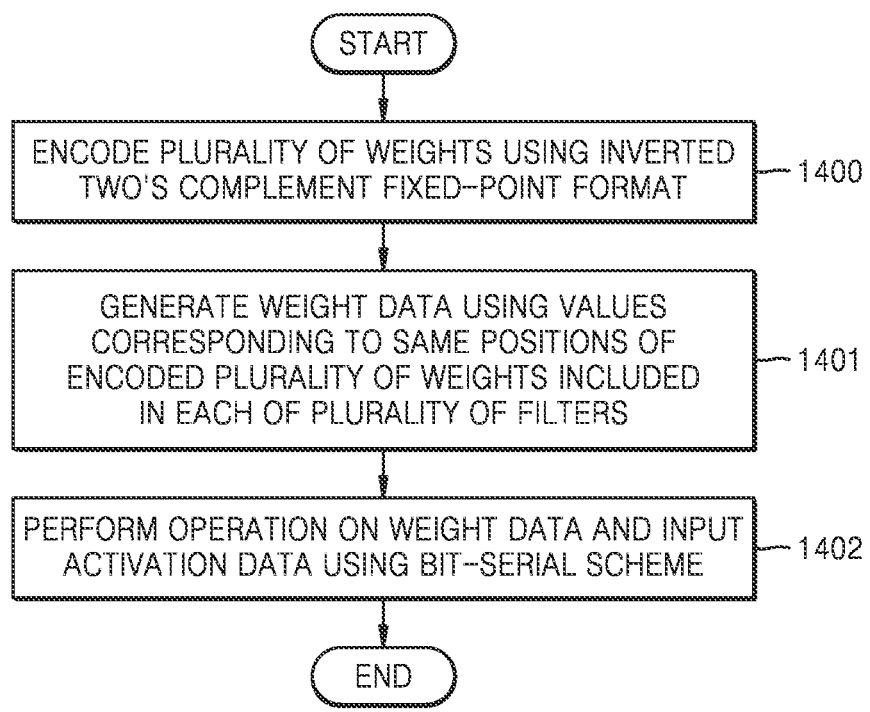
FIG. 14 is a flowchart of a neural network method according to one or more embodiments.

FIG. 14 is a flowchart of a neural network method according to one or more embodiments.

In operation 1400, the data preprocessing apparatus 320 may encode a plurality of weights using an inverted two's complement fixed-point format. In the case of the inverted two's complement fixed-point format, the plurality of weights may be encoded in which a MSB is a positive number and remaining digits are negative numbers. When a weight is encoded in the inverted two's complement fixed-point format and a final resultant value of an operation is a negative number, a sign of an operation resultant value may be changed to negative at a certain point during the operation from the MSB to a LSB of the weight. When it is determined that the sign of S is negative in an operation process, the processor 310 may output 0 and stop the operation without using a bit of a next digit of a corresponding filter weight. Therefore, a computational amount may be reduced without loss of computational accuracy.

In operation 1401, the data preprocessing apparatus 320 may generate weight data using values corresponding to the same position of the encoded weights included in each of a plurality of filters. Specifically, the data preprocessing apparatus 320 may collect values corresponding to the same position of weights which are included in one filter and have the same x and y coordinates and generate blocks. The blocks may form the weight data.

In operation 1402, the processor 310 may process the weight data and input activation data using a bit-serial scheme. The bit-serial scheme may serialize the weights and sequentially uses bits corresponding to a LSB from a MSB of the weights in an operation of sum of product. The sum-of-products operation of the bit-serial scheme may be performed in several stages of an adder tree. The PEs 360 included in the processor 310 may be configured in a 2D array and connected in a column direction as well as a row direction. The PEs 1000 may be connected in the column direction to form the adder tree. Further, for improvement of data throughput, each component included in the processor 310 may be organized in a pipeline manner.

Figure 15A:
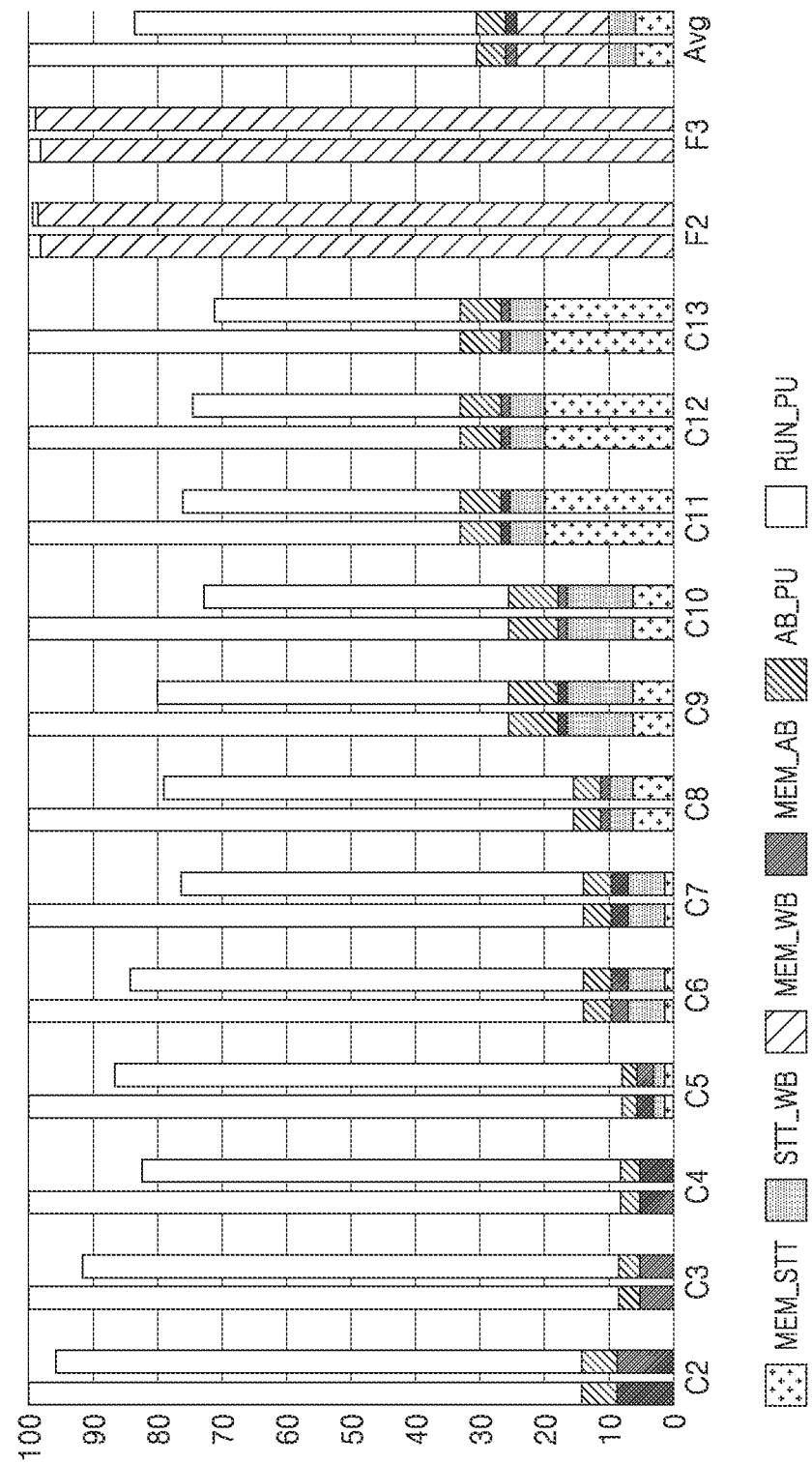
FIGS. 15A to 15C illustrate example degrees of reduction of run time, energy consumption, and power consumption according to one or more embodiments.
Figure 15B:
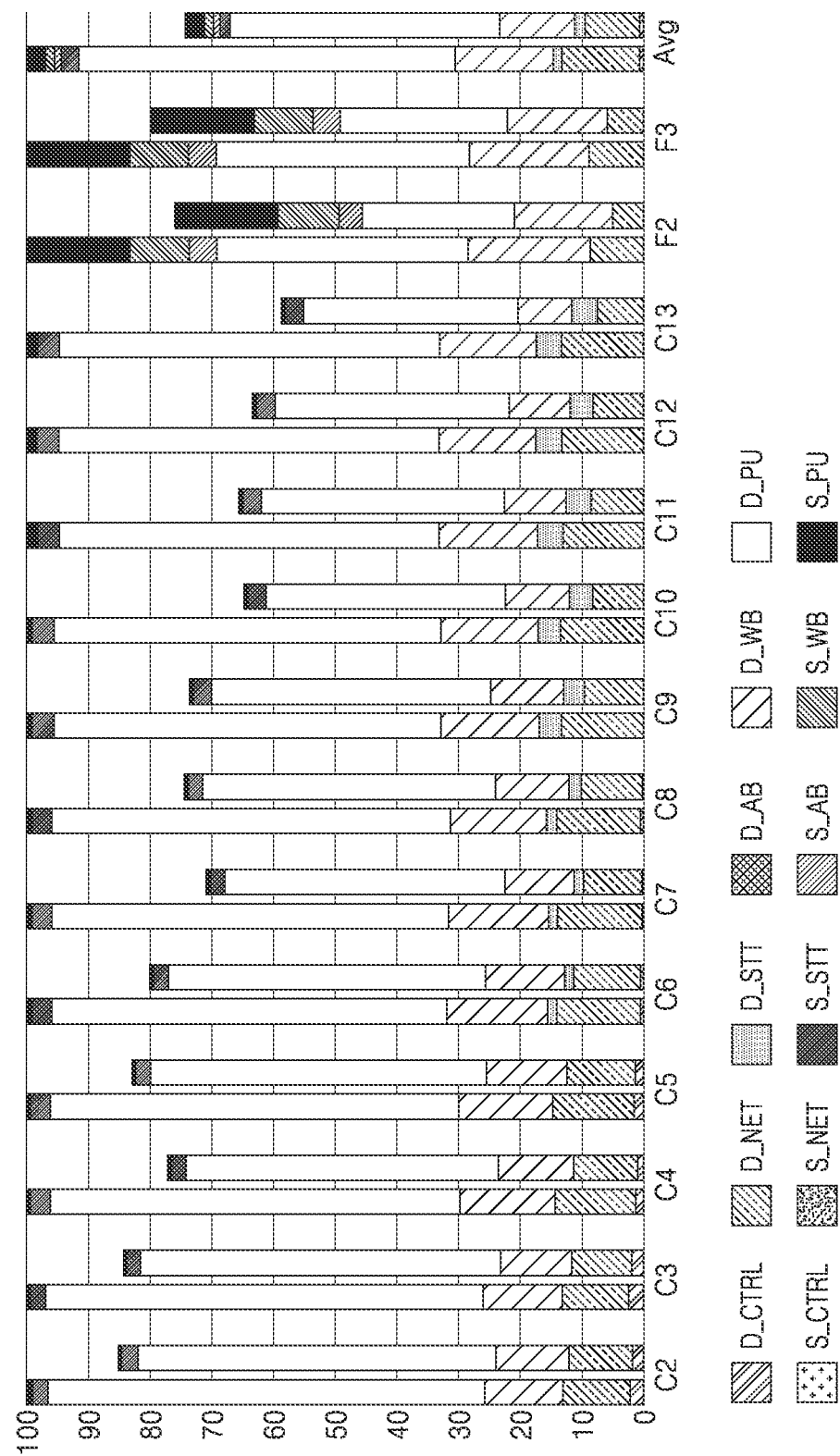
Figure 15C:
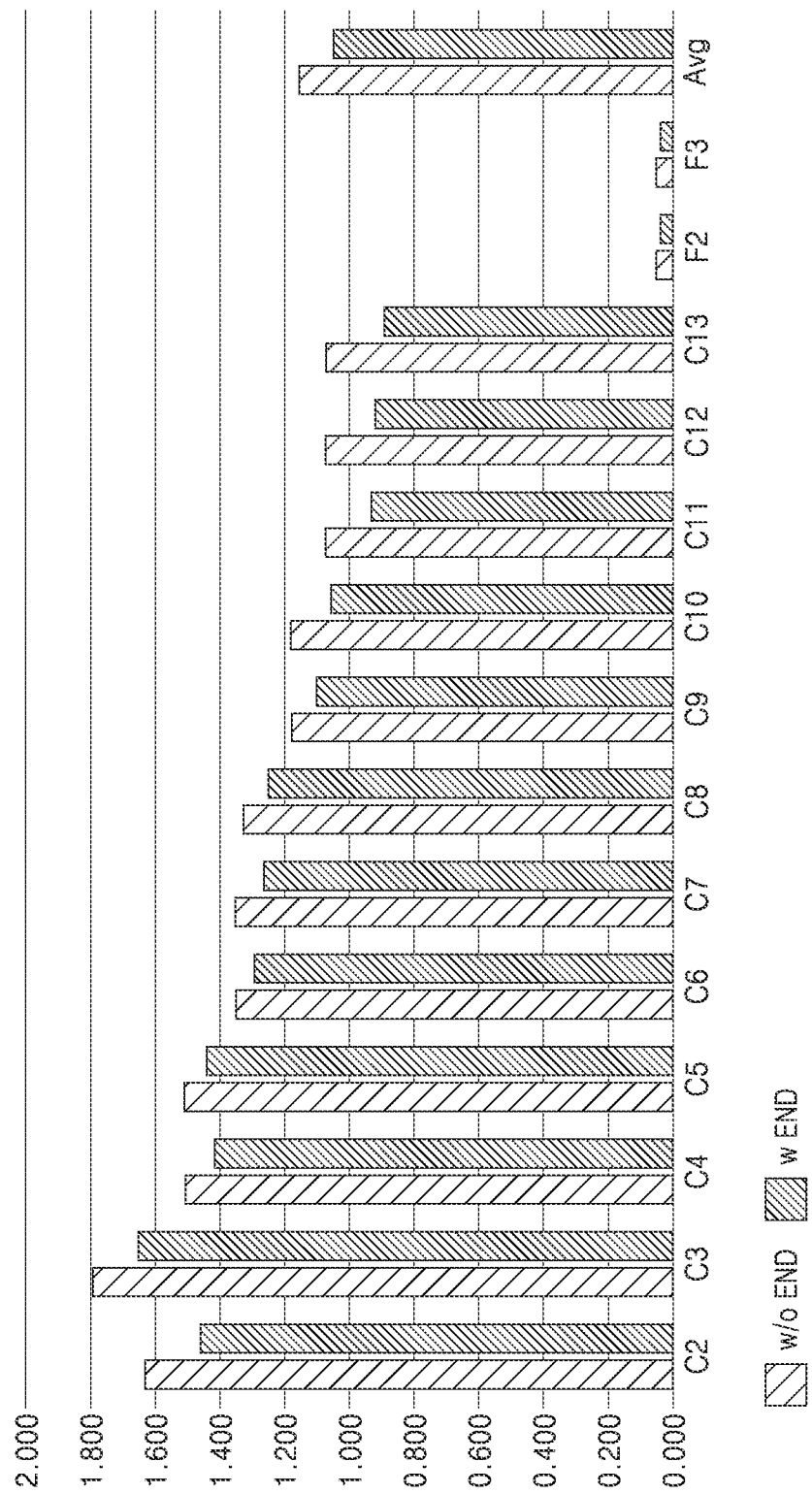

FIGS. 15A to 15C illustrate example degrees of reduction of run time, energy consumption, and power consumption according to one or more embodiments.

A case where the disclosure is applied to a VGG-16 neural network, which is a deep convolutional network including the 13 convolution layers C1 to C13 and the 3 fully-connected layers F1 to F3 and a case where the disclosure is not applied thereto are compared below. A horizontal axis represents 12 convolution layers and 2 fully-connected layers in each layer constituting the VGG-16 neural network excluding C1 and F1. A left bar for each layer indicates the case where the disclosure is not applied, and a right bar shows the case where the disclosure is applied.

Referring to FIG. 15a, the total run time may be divided into run time of each of six operations. MEM_STT, STT_WB, MEM_WB, MEM_AB, and AB_PU may indicate run time of read and write operations between an external memory and an internal memory of a processor and run time of read and write operations between the external memory or the internal memory of the processor and a buffer. MEM_STT may indicate run time of operations of reading and writing weight data from the external memory to the internal memory of the processor. STT_WB may indicate run time of operations of reading the weight data from the internal memory of the processor to the WB 340. MEM_AB may indicate run time of operations of reading and writing input activation data from the external memory to the NB 350. AB_PU may indicate run time of operations of reading and writing the input activation data from the NB 350 to the PE 360. RUN_PU may indicate run time of an operation of sum of product of the weight data and the input activation data in the PE 360. Heights of bars may represent a relative value of run time when the disclosure is applied with the run time of 100 when the disclosure is applied. Regarding the MEM_STT, STT_WB, MEM_WB, MEM_AB, and AB_PU, it may be seen that heights of left and right bars are the same for all layers. On the other hand, the run time of RUN_PU is reduced by 16.67% on average when the disclosure is applied. In other words, when the disclosure is applied, an operation time of the PE 360 necessary for the sum-of-products operation with regard to the weight data and the input activation data may be effectively reduced.

FIG. 15B shows dynamic/static D/S energy consumption of each of six components (a global controller CTRL, a data network NET, a processor internal memory STT, an input activation buffer AB, a weight buffer WB, and a PE) of a data processing apparatus. Heights of bars may represent relative values of run time when the disclosure is applied with the dynamic/static energy consumption of 100 when the disclosure is applied. It may be seen that the total energy consumption is reduced by 25.79% on average when the disclosure is applied compared to when the disclosure is not applied.

FIG. 15C shows power consumption for each layer constituting the VGG-16 neural network excluding C and F1. As apparent from FIG. 15C, the total power consumption is reduced from 1.153 watts to 1.054 watts when the disclosure is applied.

It should be understood that the examples described herein should be considered in a descriptive sense only and not for purposes of limitation. Descriptions of the features or aspects within each example should typically be considered as referring to other similar features or aspects in other example.

While one or more examples have been described with reference to the figures, it will apparent after an understanding of the present application that various changes in form and details may be made therein without departing from the spirit and scope as defined by the following claims.

The neural network 1, convolution layer 2, input activation map 210, weight filter 220, output activation map 230, data processing apparatus 300, processor 310, data preprocessing apparatus 320, memory 330, weight buffer (WB) 340, input activation buffer or node buffer (NB) 350, pieces of processing equipment (PEs) 360, global controller 370, adder 510, shifter 520, processor 900, WB 910, first WB 911, second WB 912, last WB 913, row 920, first row 921, second row 922, last row 923, PEs 1000, input adder tree 1001, input activation registers 1002, weight register 1003, input data transmission line 1004, portion 1005, pipeline list 1210, entry board 1220, shifter 1230, adder 1240, list entry 1250, entry 1260, output list entry 1270, and other components described herein with respect to FIGS. 1 through 15C are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

What is claimed is:

1. A processor-implemented data processing method comprising:
    performing a preprocessing to encode weights of filters of a neural network using an inverted two's complement fixed-point format;

performing a sum-of-products operation with respect to input activations of the neural network and the encoded weights of a current filter in a bit-serial scheme; and when it is determined that a sign of an intermediate resultant value of the sum-of-products operation for the current filter is negative, performing a sum-of-products operation with respect to the input activations and the encoded weights of a next filter in the bit-serial scheme by skipping the sum-of-products operation for the current filter.

2. The data processing method of claim 1, wherein the performing of the sum-of-products operation comprises outputting 0 in response to the intermediate resultant value being a negative number.

3. The data processing method of claim 1, wherein the performing of the sum-of-products operation comprises determining, in response to the intermediate resultant value being a positive number, whether a bit position of an encoded weight finally used in the sum-of-products operation corresponds to a least significant bit (LSB) of the current filter.

4. The data processing method of claim 3, wherein the performing of the sum-of-products operation comprises outputting the intermediate resultant value as a final resultant value in response to determining that the bit position corresponds to the LSB of the current filter.

5. The data processing method of claim 3, wherein the performing of the sum-of-products operation comprises receiving a bit value generated using a value corresponding to a next bit position of the encoded weight of the current filter in response to determining that the bit position does not corresponds to the LSB of the current filter.

6. The data processing method of claim 2, wherein the performing of the sum-of-products operation comprises:
ending the sum-of-products operation in response to determining that an encoded weight finally used in the sum-of-products operation corresponds to a weight of a last filter of the filters; and
receiving, for a subsequent operation included in the sum-of-products operation, a bit value generated using a value corresponding to an MSB of an encoded weight of the next filter in response to determining that an encoded weight finally used in the sum-of-products operation does not corresponds to a weight of the last filter of the filters.

7. The data processing method of claim 1, wherein the performing the preprocessing comprises encoding a weight using the inverted two's complement fixed-point format so that a MSB of the weight is a positive number and digits in remaining positions are negative numbers.

8. A non-transitory computer-readable recording medium storing instructions that, when executed by one or more processors, cause the one or more processors to perform the method of claim 1.

9. A neural network apparatus comprising:
a memory configured to store data of weights and input activations of a neural network; and
one or more processors configured to:
performing a preprocessing to encode the weights of filters of the neural network using an inverted two's complement fixed-point format;
performing a sum-of-products operation with respect to the input activations of the neural network and the encoded weights of a current filter in a bit-serial scheme; and
when it is determined that a sign of an intermediate resultant value of the sum-of-products operation for the current filter is negative, performing a sum-of-products operation with respect to the input activations and the encoded weights of a next filter in the bit-serial scheme by skipping the sum-of-products operation for the current filter.

10. The data processing apparatus of claim 9, wherein the one or more processors are configured to output 0 in response to the intermediate resultant value being a negative number.

11. The data processing apparatus of claim 9, wherein the one or more processors are configured to determine, in response to the intermediate resultant value being a positive number, whether a bit position of an encoded weight finally used in the sum-of-products operation corresponds to a least significant bit (LSB) of the current filter.

12. The data processing apparatus of claim 11, wherein the one or more processors are configured to output the intermediate resultant value as a final resultant value in response to determining that the bit position corresponds to the LSB of the current filter.

13. The data processing apparatus of claim 11, wherein the one or more processors are configured to receive a bit value generated using a value corresponding to a next bit position of the encoded weight of the current filter in response to determining that the bit position does not corresponds to the LSB of the current filter.

14. The data processing apparatus of claim 10, wherein the one or more processors are configured to:
end the sum-of-products operation in response to determining that an encoded weight finally used in the sum-of-products operation corresponds to a weight of a last filter of the filters; and
receive, for a subsequent operation included in the sum-of-products operation, a bit value generated using a value corresponding to an MSB of an encoded weight of the next filter in response to determining that an encoded weight finally used in the sum-of-products operation does not corresponds to a weight of the last filter of the filters.

15. The data processing apparatus of claim 9,
wherein the one or more processors are configured to receive a bit value generated using a value corresponding to a position shifted by n from a MSB of an encoded weight of the current filter in response to performing the sum-of-products operation using the bit-serial scheme, and
wherein n is a natural number.

16. The data processing apparatus of claim 9,
wherein each of pieces of processing equipment (PE) included in the one or more processors is configured to perform the sum-of-products operation on the encoded weights and the input activations, and
wherein the pieces of PE are connected to one another in a tree form.

17. The data processing apparatus of claim 9, wherein the one or more processors comprise a data network configured to match in a 1:1 correspondence weight buffers configured to store bit values of the encoded weights generated based on values corresponding to the same position of the weights included in each of the filters and rows of a matrix in which pieces of processing equipment (PE) are arranged.

18. The data processing apparatus of claim 16, wherein the pieces of PE comprise output units located at an upper portion of a tree and input units located at a lower portion of the tree in a column unit connected to the output units.

19. The data processing apparatus of claim 9, wherein the one or more processors comprise a global controller configured to determine t intermediate resultant value of a sum-of-products operation and dynamically determine next weight data received by a piece of processing equipment (PE).

20. The data processing apparatus of claim 9,
wherein the one or more processors comprise a plurality of processors, and
wherein the data processing apparatus comprises a network on chip to which the plurality of processors are connected.

* * * * *